United States Patent
Albrecht et al.

(10) Patent No.: US 9,968,191 B2
(45) Date of Patent: May 15, 2018

(54) EJECTOR ASSEMBLY FOR A MOVABLE FURNITURE PART

(71) Applicant: Grass GmbH, Hoechst (AT)

(72) Inventors: Markus Albrecht, Lustenau (AT); Stefan Baur, Goetzis (AT)

(73) Assignee: Grass GmbH, Hoechst (AT)

( * ) Notice: Subject to any disclaimer, the term of this patent is extended or adjusted under 35 U.S.C. 154(b) by 0 days. days.

(21) Appl. No.: 15/375,501

(22) Filed: Dec. 12, 2016

(65) Prior Publication Data

US 2017/0164737 A1    Jun. 15, 2017

(30) Foreign Application Priority Data

Dec. 14, 2015 (DE) .................... 20 2015 106 773 U

(51) Int. Cl.
*A47B 88/00* (2017.01)
*A47B 88/45* (2017.01)
(Continued)

(52) U.S. Cl.
CPC ............ *A47B 88/45* (2017.01); *A47B 88/463* (2017.01); *F16H 25/186* (2013.01); *A47B 88/44* (2017.01); *E05D 15/40* (2013.01)

(58) Field of Classification Search
CPC ................... F16H 25/186; E05D 15/40; A47B 2210/0078; A47B 2210/0064;
(Continued)

(56) References Cited

U.S. PATENT DOCUMENTS 3,410,330 A * 11/1968 Matyas ................. E05D 7/0027
160/206
3,854,785 A * 12/1974 Manner ................. E05C 19/022
292/DIG. 4
(Continued)

FOREIGN PATENT DOCUMENTS

AT      511335   * 11/2012
AT       15246   *  2/2017
(Continued)

OTHER PUBLICATIONS

German Search Report (Application No. 20 2015 106 773.9) dated Sep. 12, 2016.
(Continued)

*Primary Examiner* — Janet M Wilkens
(74) *Attorney, Agent, or Firm* — Burr & Brown, PLLC

(57) ABSTRACT

An ejector assembly for a movable furniture part, for example a drawer, composed of two ejector units that are interconnected by a synchronizing bar. The ejector units are provided for ejecting the movable furniture part in an opening direction of an item of furniture in relation to a furniture base unit of the item of furniture. The synchronizing bar synchronizes a switching function of the ejector units. At least one ejector unit is designed in such a manner that the synchronizing bar on a receptacle of the first ejector unit is slidable so far inward that said synchronizing bar may be introduced into a receptacle of an opposite second ejector unit. A positioning member for positioning the synchronizing bar in a functional position between the ejector units is provided.

12 Claims, 9 Drawing Sheets

(51) Int. Cl.
  *A47B 88/463* (2017.01)
  *F16H 25/18* (2006.01)
  *E05D 15/40* (2006.01)
  *A47B 88/44* (2017.01)

(58) Field of Classification Search
  CPC ............ A47B 2210/0067; A47B 88/45; A47B 88/463; A47B 88/44
  USPC ...................................... 312/331, 333, 319.1
  See application file for complete search history.

(56) References Cited

U.S. PATENT DOCUMENTS

| | | | |
|---|---|---|---|
| 8,328,299 B2 * | 12/2012 | Hashemi | E05B 47/00 |
| | | | 312/319.5 |
| 8,764,135 B1 * | 7/2014 | Huang | A47B 88/40 |
| | | | 312/331 |
| 8,950,833 B2 * | 2/2015 | Bohle | E05D 15/463 |
| | | | 312/323 |
| 9,085,925 B2 * | 7/2015 | Steinhauser | E05D 15/40 |
| 9,648,951 B2 * | 5/2017 | Albrecht | E05B 63/22 |
| 2008/0036345 A1 * | 2/2008 | Kropf | E05B 65/46 |
| | | | 312/333 |
| 2009/0039745 A1 * | 2/2009 | Wong | E05C 19/02 |
| | | | 312/333 |
| 2012/0038255 A1 * | 2/2012 | Netzer | A47B 88/0477 |
| | | | 312/319.1 |
| 2013/0328468 A1 * | 12/2013 | Schneider | A47B 88/047 |
| | | | 312/319.1 |
| 2013/0334946 A1 | 12/2013 | Netzer et al. | |
| 2014/0191632 A1 | 7/2014 | Steinhauser | |
| 2014/0210329 A1 * | 7/2014 | Brunnmayr | A47B 88/16 |
| | | | 312/333 |
| 2014/0265783 A1 * | 9/2014 | Hauer | A47B 88/12 |
| | | | 312/331 |
| 2014/0319986 A1 * | 10/2014 | Brunnmayr | A47B 88/0481 |
| | | | 312/319.1 |
| 2017/0020285 A1 * | 1/2017 | Schallert | A47B 88/047 |
| 2017/0049228 A1 * | 2/2017 | Albrecht | A47B 88/0477 |
| 2017/0049231 A1 * | 2/2017 | Fellner | A47B 88/0477 |
| 2017/0049232 A1 * | 2/2017 | Rihtarec | A47B 88/0477 |
| 2017/0049235 A1 * | 2/2017 | Albrecht | E05F 1/16 |
| 2017/0051813 A1 * | 2/2017 | Karu | E05F 1/16 |
| 2017/0079430 A1 * | 3/2017 | Goetz | A47B 88/477 |
| 2017/0095084 A1 * | 4/2017 | Koenig | A47B 88/463 |

FOREIGN PATENT DOCUMENTS

| | | | |
|---|---|---|---|
| DE | 202009013733 | * | 3/2011 |
| DE | 202012002378 | * | 6/2013 |
| DE | 20 2015 001 186 U1 | | 4/2015 |
| DE | 202015104434 | * | 11/2016 |
| DE | 202015104439 | * | 11/2016 |
| EP | 2 429 339 B1 | | 3/2013 |
| WO | 2010/129971 A1 | | 11/2010 |
| WO | 2013/040611 A1 | | 3/2013 |
| WO | 2016164942 | * | 10/2016 |

OTHER PUBLICATIONS

Extended European Search Report (Application No. 16200517.7) dated Apr. 21, 2017.

* cited by examiner

EJECTOR ASSEMBLY FOR A MOVABLE FURNITURE PART

This application claims the benefit under 35 USC § 119(a)-(d) of German Application No. 20 2015 106 773.9 filed Dec. 14, 2015, the entirety of which is incorporated herein by reference.

FIELD OF THE INVENTION

The present invention relates to an ejector assembly for a movable furniture part, and to an item of furniture having such a device.

BACKGROUND OF THE INVENTION

An ejector assembly of the type mentioned at the outset is known, and comprises two ejector units, for example.

The ejector assembly is provided for ejecting a movable furniture part, for example, a drawer, in an opening direction of the furniture base unit. To this end, the ejector units are disposed in a positionally fixed manner on the rear side of a furniture base unit, for example, and are interconnected by way of a synchronizing bar which couples a movement of the ejector assembly.

When the ejector assembly is being fitted, the synchronizing bar is cut to length by a technician and is fitted conjointly with the ejector units.

SUMMARY OF THE INVENTION

The present invention is based on the object of providing an alternative ejector assembly for a movable furniture part that facilitates fitting of the ejector units to the furniture part and/or of the synchronizing bar to the ejector units.

The present invention proceeds from an ejector assembly for a movable furniture part, for example, a drawer, wherein the ejector assembly is composed of two ejector units which are interconnected by a synchronizing bar, wherein the ejector units are provided for ejecting the movable furniture part in an opening direction of an item of furniture in relation to a furniture base unit of the item of furniture, and wherein the synchronizing bar synchronizes a switching function of the ejector units.

The ejector unit may, in particular, be fitted to a lower side of a bottom of a drawer. Advantageously, when viewed from a drawer front, two ejector units of one ejector assembly are disposed on the left and on the right, respectively, so as to be separate from one another and opposite one another on the lower side of the drawer bottom. It is also imaginable for the ejector units to be fastened to a furniture base unit in a positionally fixed manner in relation to a movable furniture part. Upon one or both ejector units being activated or triggered, for example, by the drawer being pushed beyond a resting position in the closing direction by a user, the synchronizing bar mutually synchronizes the ejector units, and the ejector units may conjointly eject the drawer in the opening direction. Reliable and simultaneous triggering of the two ejector units is, thus, guaranteed by the synchronizing bar.

The core concept of the present invention now lies in that at least one ejector unit is designed in such a manner that the synchronizing bar on a receptacle of the first ejector unit is slidable so far inward that the synchronizing bar may be introduced into a receptacle of an opposite second ejector unit, wherein a positioning member for positioning the synchronizing bar in a functional position between the ejector units is provided.

A design embodiment according to the present invention of the receptacle enables the synchronizing bar to be fitted and removed again once the ejector units have been fixedly fitted to the drawer, for example. On account thereof, fitting of the synchronizing bar is simplified such that the fitting may, in particular, be performed separately from fitting the ejector units to the movable furniture part.

In the functional position, the synchronizing bar is positioned in a centered manner between the ejector units, for example, and is plug-fitted preferably to identical depths in both ejector units.

The positioning member advantageously enables equalization of the longitudinal tolerance of the synchronizing bar. For example, a length of the synchronizing bar that is adapted in such a manner so as to interconnect the two ejector units may vary by up to 30 mm. Advantageously between 0 and 25 mm, between 0 and 20 mm, between 0 and 15 mm, between 0 and 10 mm, or between 0 and 5 mm. A difference in length may be equalized by way of the possibility of deep insertion into an ejector unit.

Moreover, it is of advantage that the ejector units and/or the synchronizing bar are/is configured such that the synchronizing bar, in a fitted position of the ejector units on the item of furniture, may be inserted between the ejector units. It is conceivable herein that the synchronizing bar is designed so as to be length adjustable, optionally so as to be telescopic.

It is furthermore proposed that the positioning member comprises at least one spring element.

The spring element urges, for example, the synchronizing bar in the fitted state on the ejector units into the functional position.

In one advantageous design embodiment of the receptacle, the synchronizing bar when being fitted is insertable into the receptacle counter to the force of the spring element.

It is also imaginable for the positioning member to be designed in the fashion of a bayonet or a gate. On account thereof, a synchronizing bar in the case of an insertion motion by way of the first end thereof may be guided on the ejector unit such that the synchronizing bar by way of the second end thereof may be inserted into the second ejector unit which is disposed so as to be opposite the first ejector unit, and the synchronizing bar is subsequently moved into the functional position between the two ejector units, wherein the positioning member that is designed in the fashion of a bayonet or a gate may provide locking of the synchronizing bar in at least one ejector unit.

It is also proven to be advantageous that the receptacle has a transmission member which is designed in such a manner that the synchronizing bar couples to the transmission member in a substantially form-fitting manner such that a movement of the receptacle may be transmitted to the synchronizing bar, in particular, to the opposite ejector unit.

A rotary movement and/or a linear sliding movement of the receptacle is advantageously transmittable to the synchronizing bar by virtue of the transmission member.

In particular, the synchronizing bar in the cross section to a longitudinal axis has an out-of-round contour by way of which the synchronizing bar in a known manner is disposable on the receptacle in a form-fitting manner. For example, the contour is configured so as to be rectangular, in particular, polygonal, or elliptic.

The transmission member of the receptacle preferably has a contour which is complementary to the external contour of the synchronizing bar. For example, the transmission member is designed in a tubular fashion, having an internal contour which is complementary to the external contour of the synchronizing bar.

It is also of advantage that the receptacle comprises a repositionable guide element which in the fitted state of the synchronizing bar on the receptacle acts between the positioning means and the synchronizing bar.

The guide element transmits a force of the positioning member, and thus advantageously a movement of the positioning member, to a synchronizing bar which is disposed in the receptacle, for example.

For example, in the case of the synchronizing bar being inserted into the receptacle, the guide element transmits the force of the positioning member to the synchronizing bar in a force direction that is parallel with a rotation axis of the receptacle and/or a longitudinal axis of the guide element and/or a longitudinal axis of the synchronizing bar. In particular, the rotation axis of the receptacle and/or the longitudinal axis of the guide element and/or the longitudinal axis of the synchronizing bar that is inserted into the receptacle are congruent.

A movement of the guide element in turn is preferably guided by a guide contour that is configured on the receptacle, this guide contour corresponding in particular to the contour of the transmission member. The movement of the guide element in the fitted state of the ejector unit is advantageously configured so as to be perpendicular to a movement direction of the drawer, and parallel with the drawer bottom, or so as to be parallel with the longitudinal axis of the synchronizing bar that is inserted into the receptacle.

In one advantageous modification of the ejector assembly, the guide element has a coupling member which may couple to the synchronizing bar in a form-fitting manner. The coupling member of the guide element advantageously catches the synchronizing bar, in particular, a front side of the synchronizing bar, in such a manner that the coupling member and the synchronizing bar is held in a substantially form-fitting manner at least in one direction that is perpendicular to a force of the positioning member that acts on the synchronizing bar.

It is also of advantage that the receptacle has a guide member for the positioning member.

A movement direction of the positioning member, for example, of the spring element, and/or of the guide element, is predefined by the guide member. Advantageously, the positioning member, in particular, the spring element, and/or the guide element, is/are movably mounted, for example, linearly by means of the guide member. On account thereof, the positioning member and/or the guide element may not cant or jam, respectively, in the case of movement.

It is furthermore proposed that the guide element is designed so as to be pin-shaped.

A pin-shaped design of the guide element advantageously enables the guide element to be mounted on the receptacle, in particular, on the guide member, so as to be movable, for example linearly displaceable and/or rotatable, at two mutually opposite ends.

It is moreover advantageous for the guide element to have a detent.

By way of a detent of the guide element the spring element may be disposed on the receptacle and on the guide element in such a manner that the spring element is under pre-tensioning.

Advantageously, the receptacle comprises a retaining element, and the detent of the guide element is configured so as to abut the retaining element such that the guide element in the fitted state on the receptacle cannot be released from the latter.

In particular, the guide element, and thus the detent of the guide element, are urged toward the retaining element by the force of the positioning member, for example, of the spring element. Upon abutment of the detent of the guide element on the retaining element, a movement of the guide element is stopped, the spring element in this position being subjected to pre-tensioning.

It is also of advantage that the guide element is designed for guiding the positioning member, for example a coil spring.

By way of the design of the guide element that may be pin-shaped, for example, a force of the positioning member, in particular, of the coil spring, may advantageously be linearly transmitted. It is also conceivable that a force of a helical spring or of a leg spring may be transmittable by way of the guide element.

BRIEF DESCRIPTION OF THE DRAWINGS

An exemplary embodiment will be explained in more detail by means of the schematic drawings hereunder, while stating further individual details and advantages.

DETAILED DESCRIPTION OF THE INVENTION

Figure 1:
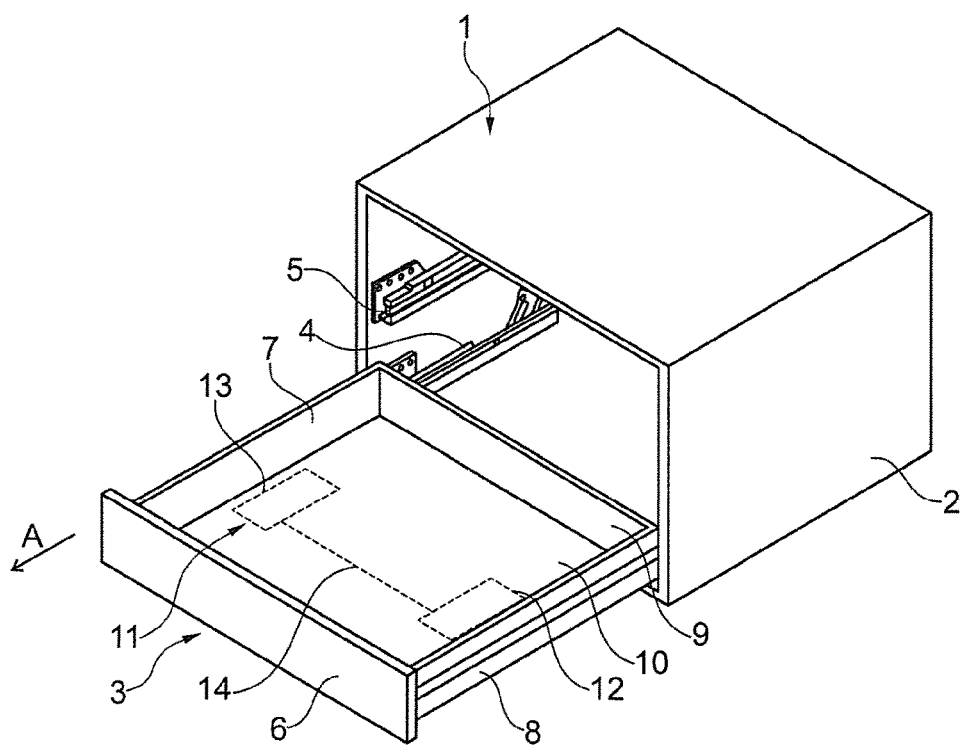
FIG. 1 shows a perspective view of an item of furniture having a drawer and an ejector assembly disposed thereon.

An item of furniture 1 according to the present invention is shown in FIG. 1. The item of furniture comprises a furniture base unit 2 and a drawer 3 that is in the opened state on the furniture base unit 2. The drawer 3 is displaceably guided on pull-out guides 4, 5 on the furniture base unit 1, and comprises a drawer front 6, drawer side walls 7, 8, a rear wall 9, and a drawer bottom 10. An ejector assembly 11 (illustrated by dashed lines) is fitted on a lower side of the drawer bottom 10. The ejector assembly 11 comprises two ejector units 12 and 13 which are interconnected by a synchronizing bar 14 (illustrated by dashed lines).

The drawer 3, from a closed state on the furniture base unit 2, by means of the ejector units 12, 13 of the ejector assembly 11 that are synchronized by the synchronizing bar 14, may be ejected in an opening direction A to an opened state on the furniture base unit 2.

The ejector units 12, 13 are activated externally by a user, for example, in that the latter moves the drawer 3 counter to an opening direction A, for example, by way of finger pressure, and on account thereof activates at least one ejector unit 12, 13. In the case of one ejector unit 12, 13 being activated, the second ejector unit 12, 13 that is disposed opposite is also activated by the synchronizing bar 14 and synchronized with a movement of the first ejector unit 12, 13.

Figure 2:
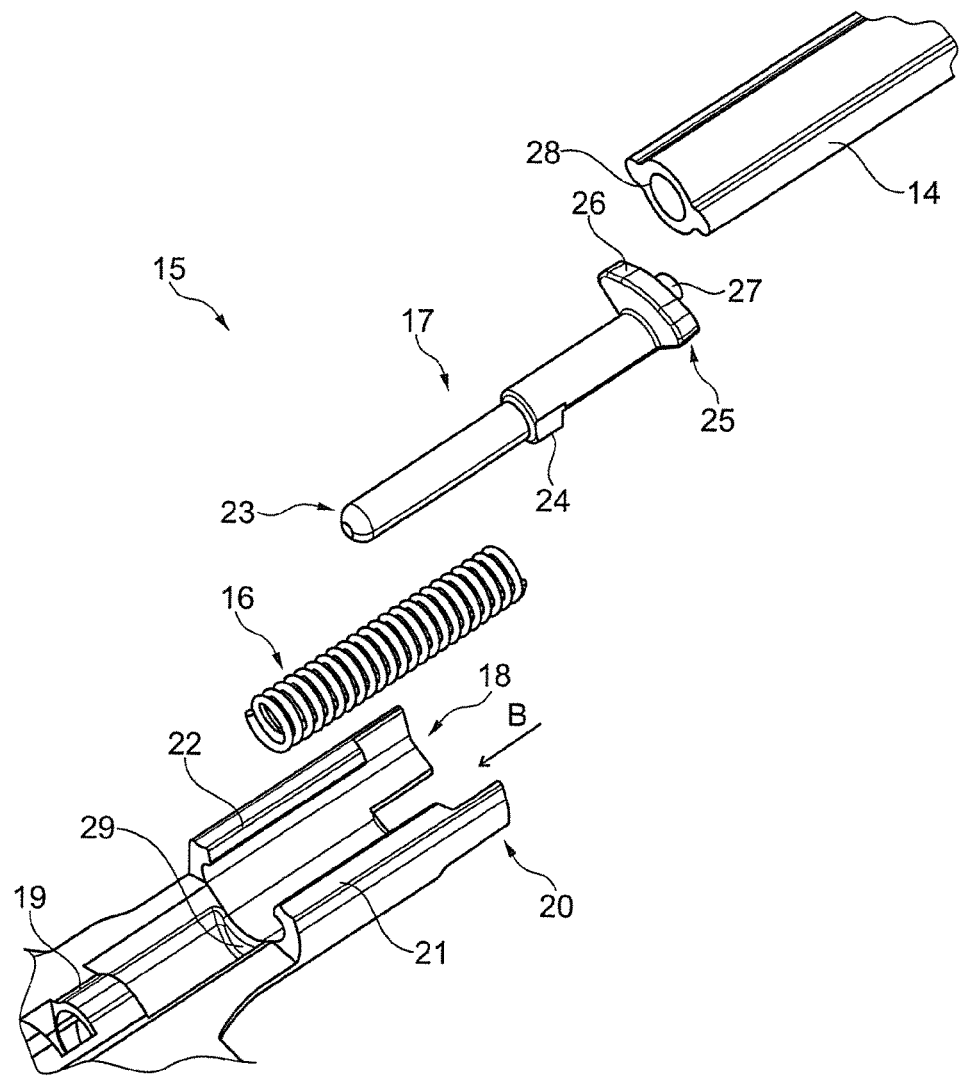
FIG. 2 shows a perspective exploded illustration of a receptacle of an ejector unit of the ejector assembly.

A receptacle 15 according to the invention of an ejector unit 12, 13 comprises a positioning member which is configured as a coil spring 16, for example, a pin-shaped guide element 17, a transmission member 18, and a guide member 19 (FIG. 2).

The synchronizing bar 14, in a manner perpendicular to the longitudinal axis thereof, has a UFO-type external contour, and along the longitudinal axis of the former, has a hollow cylindrical core 28. By way of the UFO-type external contour the external contour is out-of-round and, on account thereof, in the inserted state in the receptacle 15 may configure a substantial form-fit with the transmission member 18. To this end, the transmission member 18 comprises an internal contour which is identical or at least similar to the external contour of the synchronizing bar 14, such that a movement of the receptacle 15 may be transmitted to the synchronizing bar 14, or vice versa.

Furthermore, the transmission member 18 is designed in such a manner that the synchronizing bar 14 in a forward region 20 may be inserted into the transmission member 18 in the insertion direction B, or perpendicularly to the insertion direction B. In order for a movement to be able to be transmitted from the transmission member 18 to the synchronizing bar 14, the synchronizing bar 14 subsequently has to be inserted into the transmission member 18 in the insertion direction B. To this end, the transmission member 18 has lips 21, 22 which during the insertion procedure guide the synchronizing bar 14, on the one hand, and on the other hand guarantees a transmission of force or of a rotary movement, respectively, in that the lips 21, 22 encompass or encircle the UFO-type peripheries of the external contour.

For example, the guide element 17 is designed in a cylindrical manner at a first end 23 such that the former may be rotatably mounted on the guide member 19. Moreover, the external diameter of the cylindrical end 23 is such that the coil spring 16 may be push-fitted onto the end 23. In the inserted state of the coil spring 16 and of the guide element 17 on the receptacle 15, the coil spring 16 by way of a first end abuts a detent on the receptacle 15 (not shown), and by way of a second end that is opposite the first end abuts a detent 24 of the guide element 17.

The guide element 17, on a second end that is opposite the first end 23, comprises a coupling member 25. The coupling member 25 is designed in such a manner, for example, that it has an external contour 26 that is identical to the external contour of the synchronizing bar 14. On account thereof, the guide element 17 in the inserted state on the receptacle 15 is guided so as to be linearly movable by the transmission member 18 at the second end. The coupling member 25 furthermore has a coupling element 27 which during fitting of the synchronizing bar 14 engages in the hollow core 28 of the synchronizing bar 14, fixing the latter perpendicularly to the longitudinal axis thereof on the coupling member 25 such that a movement of the synchronizing bar 14, in particular, in the insertion direction B on the ejector unit 12, or in the insertion direction C on the ejector unit 13, is guided.

In the assembled state of the receptacle 15 the guide element 17 by way of the detent 24 of the latter abuts a retaining element 29 of the receptacle 15. On account thereof, the guide element 17 is unable to drop out of the receptacle 15. On account thereof, the coil spring 16 is furthermore held under pre-tensioning.

Fitting of the synchronizing bar 14 to the ejector assembly 11 that is fitted on the drawer-bottom lower side 30 is described hereunder by means of FIGS. 3 to 13.

Figure 3:
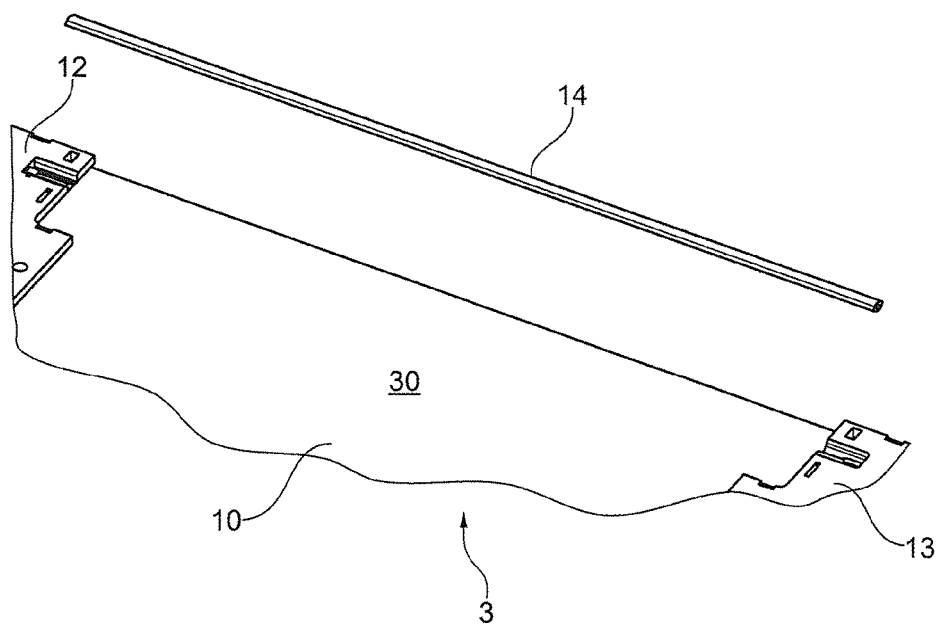
FIGS. 3 to 13 show a fitting sequence of a synchronizing bar to an ejector assembly, in a perspective view onto a lower side of a drawer bottom (FIGS. 3, 4, 6-12) having an ejector assembly disposed thereon, or in a perspective view onto a receptacle of FIG. 2 (FIGS. 5, 13).

In the first fitting step, the ejector unit 13 is fitted by a technician on the right side to the drawer-bottom lower side 30, and the ejector unit 12 is fitted opposite thereto on the left side, for example, by screwing or adhesive bonding. Thereafter, the length of the synchronizing bar 14 is adapted by the technician, so as to correspond to the spacing of the ejector units 12, 13, the synchronizing bar 14 being cut to length, for example (FIG. 3).

Figure 4:
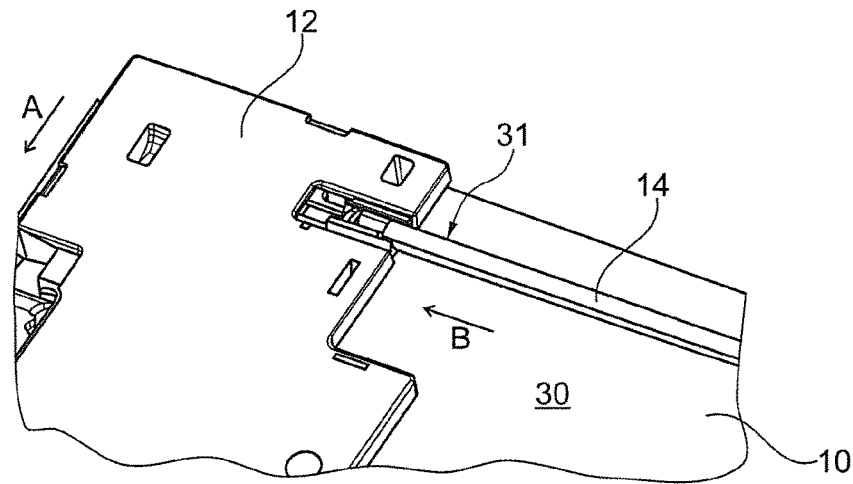
Figure 5:
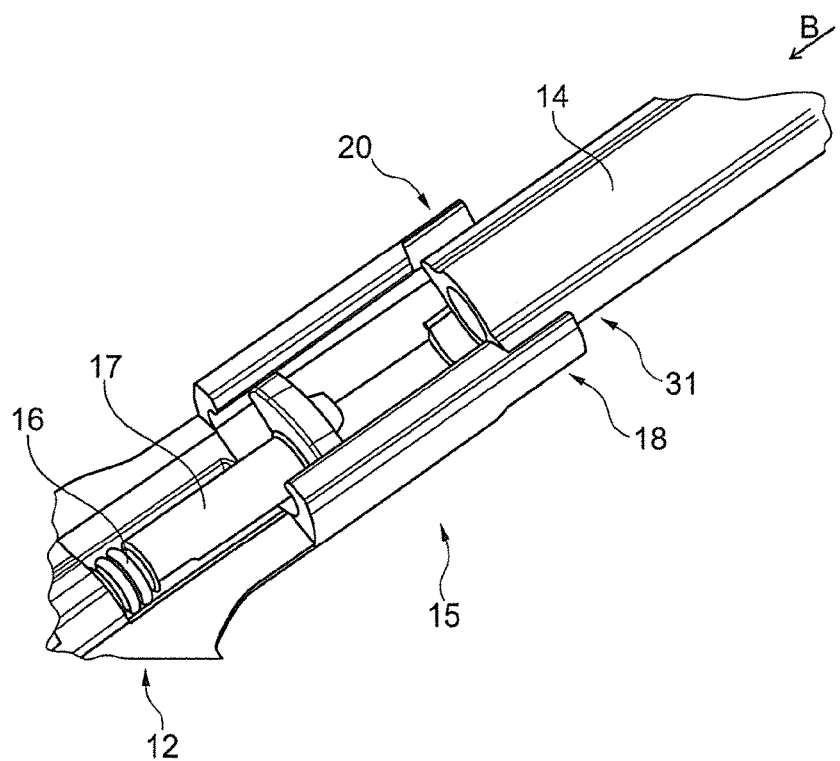
Figure 6:
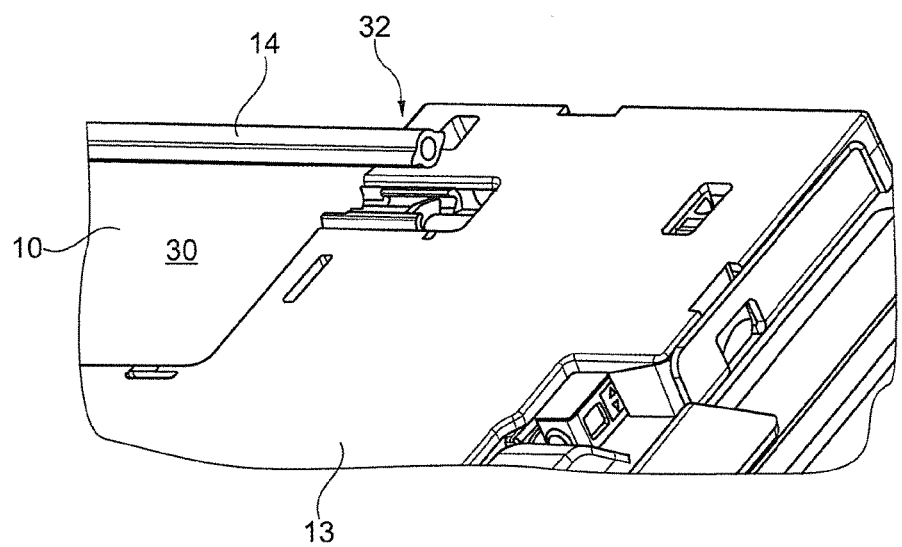

In a subsequent fitting step, the synchronizing bar 14 by way of a first end 31 is inserted into the left ejector unit 12, for example (FIGS. 4, 5). In this fitted state, the synchronizing bar 14 is still disposed between the ejector units 12, 13 in such a manner that said synchronizing bar by way of the second end 32 thereof that is opposite the first end 31 cannot be inserted into the receptacle 15 of the ejector unit 13 (FIG. 6), since the length of the synchronizing bar 14 is greater than the distance between the insertion regions 20 of the receptacles 15 of the ejector units 12, 13.

Figure 7:
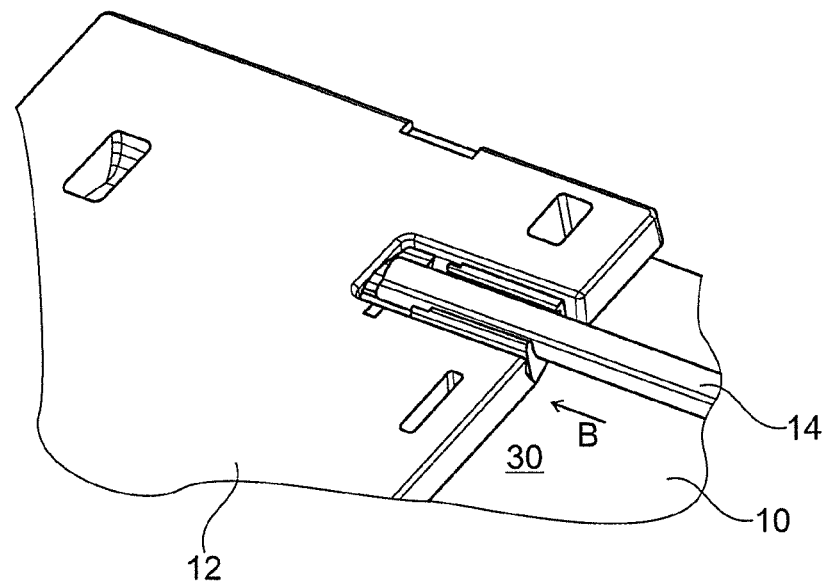
Figure 8:
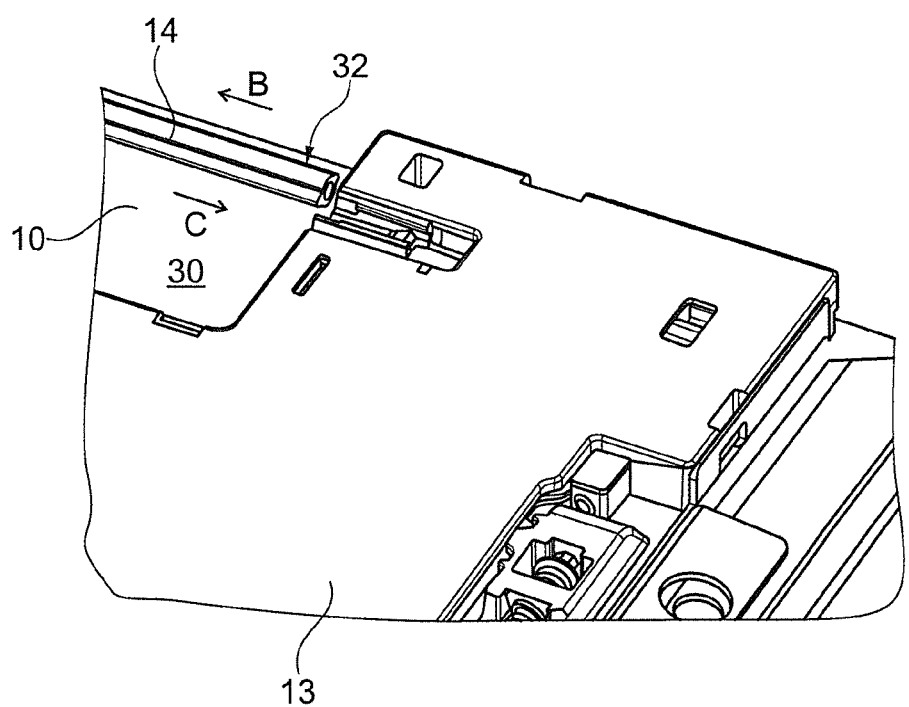

In order for the synchronizing bar 14 to be able to be inserted into the receptacle 15 of the ejector unit 13 that is disposed opposite, the synchronizing bar 14 in a further fitting step in the insertion direction B is pushed into the receptacle 15 of the ejector unit 12, counter to a spring force of the coil spring 16. Herein, the synchronizing bar 14 is pushed by a technician so far into the receptacle 15 of the ejector unit 12 until the synchronizing bar 14 by way of the opposite end 32 thereof may be inserted into the opposite receptacle 15 of the ejector unit 13 (FIGS. 7, 8).

Figure 9:
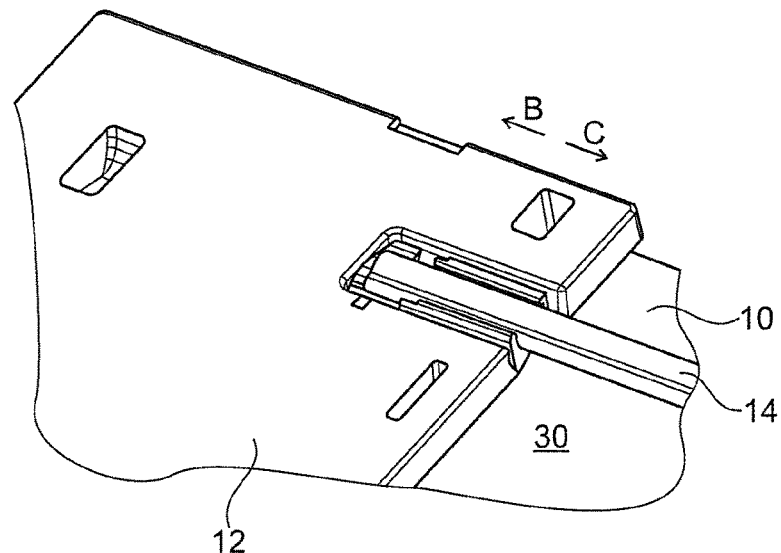
Figure 10:
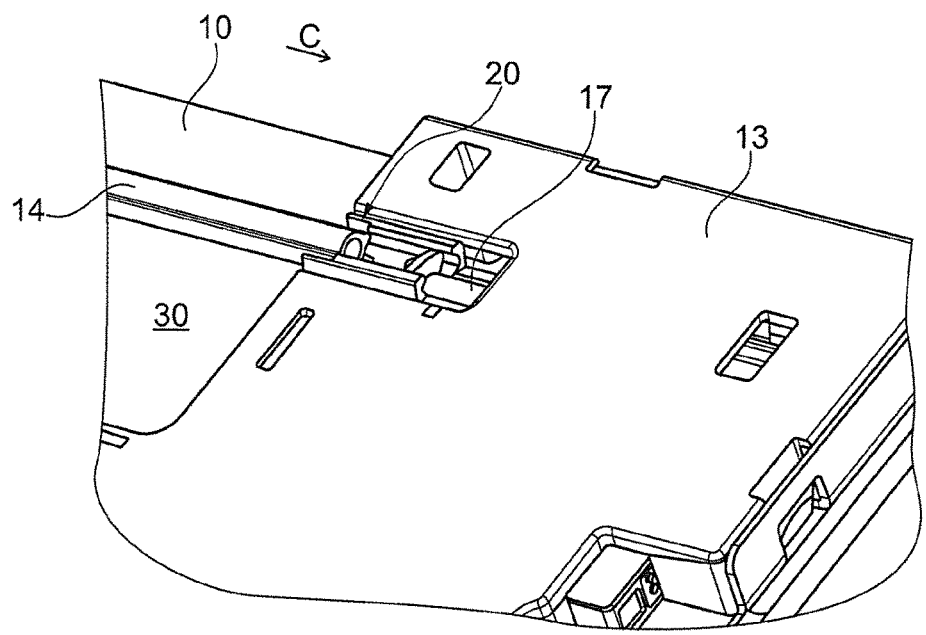

If and when the synchronizing bar 14 has been pushed so far into the ejector unit 12 that the former by way of the opposite end 32 thereof may be inserted into the ejector unit 13, the technician guides the end 32 toward the insertion region 20 of the ejector unit 13, inserting the synchronizing bar 14 by way of the end 32 into the receptacle 15 of the ejector unit 13. The technician is supported herein by the spring force of the coil spring 16 of the ejector unit 12, in that the spring force by way of the guide element 17 urges the synchronizing bar 14 in the insertion direction C of the ejector unit 13 (FIGS. 9, 10).

Figure 11:
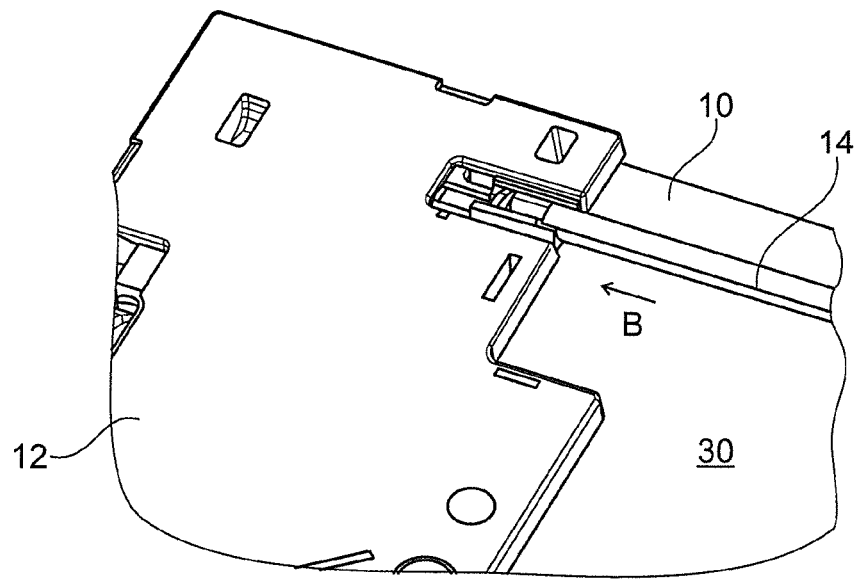
Figure 12:
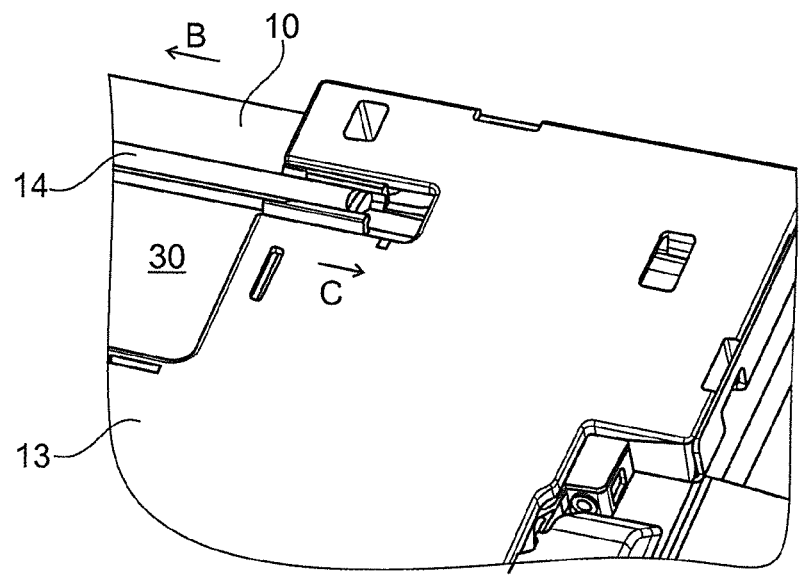
Figure 13:
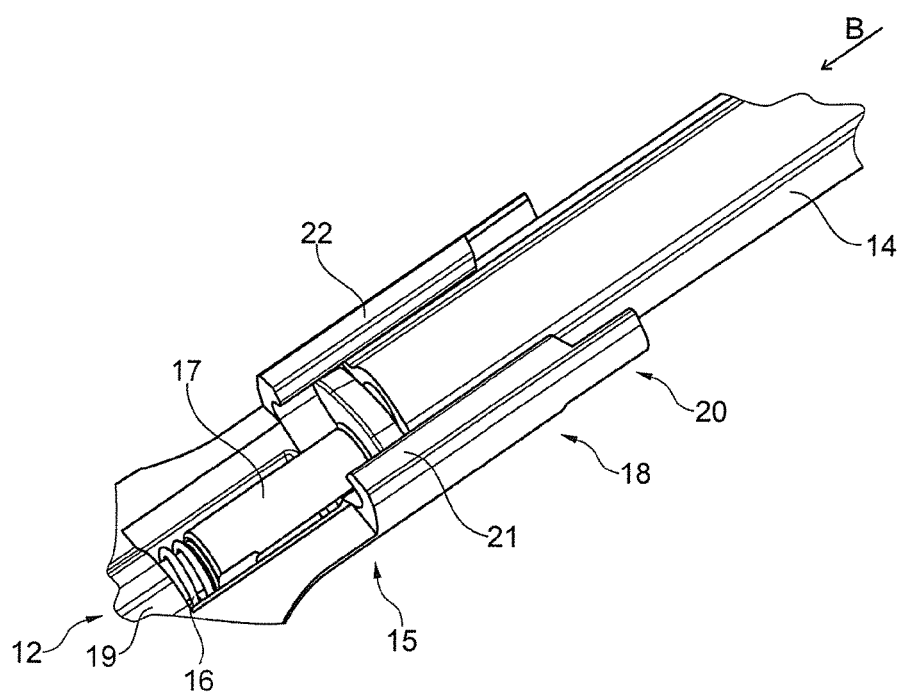

In the final fitting step, the technician lets go of the synchronizing bar 14, the latter being centered in the functional position thereof between the ejector units 12 and 13 by the two coil springs of the ejector units 12 and 13 (FIGS. 11, 12).

LIST OF REFERENCE SIGNS

1 Item of furniture
2 Furniture base unit
3 Drawer
4, 5 Pull-out guide
6 Front
7, 8 Side wall
9 Rear wall
10 Bottom
11 Ejector assembly
12, 13 Ejector unit
14 Synchronizing bar
15 Receptacle
16 Coil spring
17 Guide element
18 Transmission member
19 Guide member
20 Region
21, 22 Lip
23 End
24 Detent
25 Coupling member
26 External contour
27 Coupling element 28 Core
29 Retaining element
30 Lower sides
31, 32 End

The invention claimed is:

1. An ejector assembly for a movable furniture part, the ejector assembly comprising:
   first and second ejector units that are interconnected by a synchronizing bar and which are adapted to eject the movable furniture part in an opening direction of a furniture item in relation to a furniture base unit of the furniture item; and
   a positioning member for positioning the synchronizing bar in a functional position between the first and second ejector units, wherein the positioning member comprises at least one spring element;
   wherein the synchronizing bar synchronizes a switching function of the first and second ejector units, and
   wherein the synchronizing bar on a receptacle of one of the first and second ejector units is inwardly slidable so that the synchronizing bar may be introduced into a receptacle of the opposed other one of the first and second ejector units.

2. The ejector assembly for a movable furniture part according to claim 1, wherein the receptacle has a transmission member, and wherein the synchronizing bar couples to the transmission member in a substantially form-fitting manner such that a movement of the receptacle is transmitted to the synchronizing bar.

3. The ejector assembly for a movable furniture part according to claim 1, wherein the receptacle comprises a repositionable guide element that, in a fitted state of the synchronizing bar on the receptacle, acts between the positioning member and the synchronizing bar.

4. The ejector assembly for a movable furniture part according to claim 3, wherein the guide element has a coupling member that couples to the synchronizing bar in a form-fitting manner.

5. The ejector assembly for a movable furniture part according to claim 3, wherein the guide element is pin-shaped.

6. The ejector assembly for a movable furniture part according to claim 3, wherein the guide element has a detent.

7. The ejector assembly for a movable furniture part according to claim 6, wherein the receptacle comprises a retaining element, and the detent of the guide element abuts the retaining element such that the guide element in the fitted state on the receptacle, cannot be released from the receptacle.

8. The ejector assembly for a movable furniture part according to claim 3, wherein the guide element guides the positioning member.

9. The ejector assembly for a movable furniture part according to claim 8, wherein the positioning member is a coil spring.

10. The ejector assembly for a movable furniture part according to claim 1, wherein the receptacle has a guide member for the positioning member.

11. An item of furniture having an ejector assembly for a movable furniture part according to claim 1.

12. An ejector assembly for a movable furniture part, the ejector assembly comprising:
    first and second ejector units that are interconnected by a synchronizing bar and which are adapted to eject the movable furniture part in an opening direction of a furniture item in relation to a furniture base unit of the furniture item; and
    a positioning member for positioning the synchronizing bar in a functional position between the first and second ejector units, wherein the positioning member comprises at least one spring element;
    wherein the synchronizing bar synchronizes a switching function of the first and second ejector units,
    wherein at least one of the first and second ejector units and the synchronizing bar is configured such that the synchronizing bar, in a fitted position of the first and second ejector units on the furniture item, can be inserted between the first and second ejector units.

* * * * *